Oct. 31, 1933.   B. J. VICTOR   1,932,539
GASKET
Filed Oct. 29, 1930
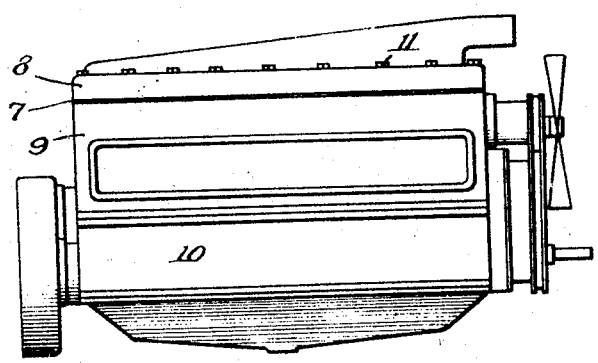
Fig.1
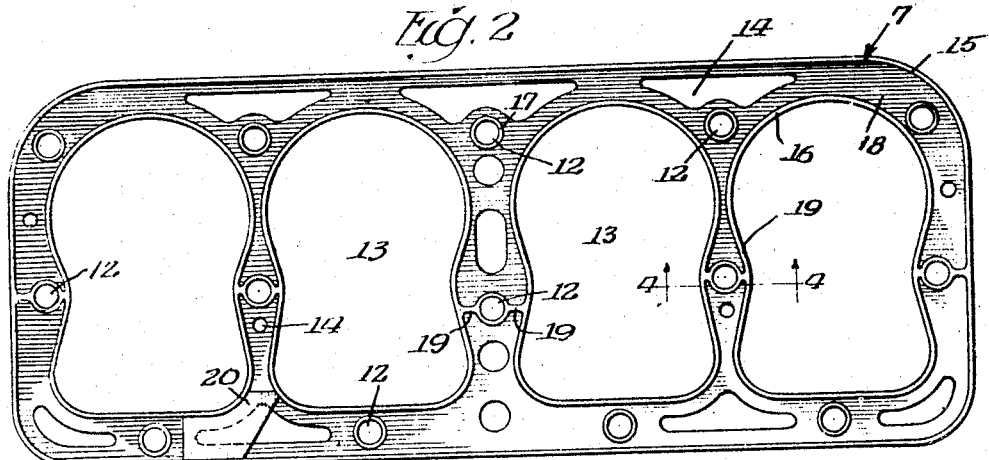
Fig.2
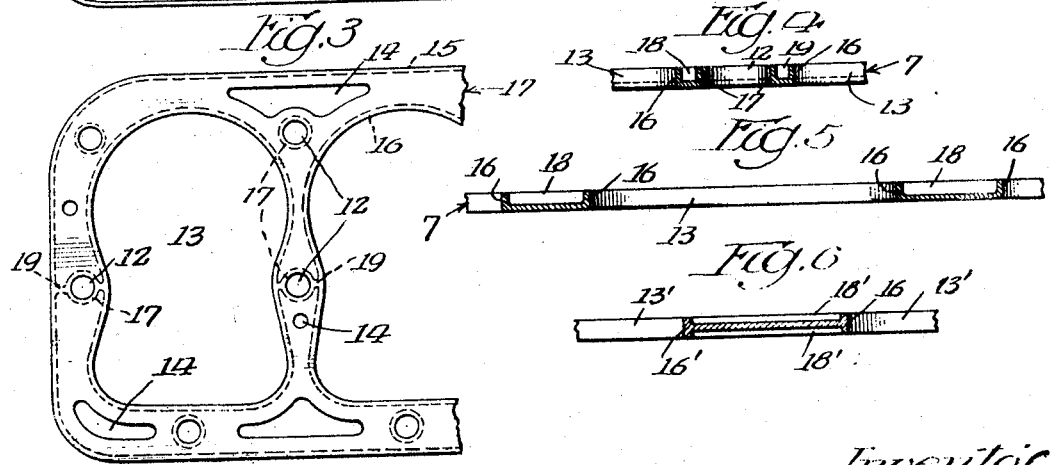
Inventor
Benjamin J. Victor
By Wm. D. Bell Atty

UNITED STATES PATENT OFFICE 1,932,539

GASKET

Benjamin J. Victor, Oak Park, Ill., assignor to Victor Manufacturing & Gasket Company, Chicago, Ill., a corporation of Illinois Application October 29, 1930. Serial No. 491,937

15 Claims. (Cl. 288—1)

This invention relates to gaskets of the type generally subjected to high temperatures and pressures and the salient object is to cool the gasket while in use to prevent damage and deterioration.

Other objects of the invention are to provide a novel gasket having a cooling chamber therein adapted to receive a cooling medium; to cool the gasket by using the cooling medium employed in the device with which the gasket is used; and to regulate the circulation of the cooling medium.

A gasket of this type may be used as a cylinder head gasket in internal combustion engines and especially, though not necessarily, in water cooled engines wherein a circulation of the cooling medium is effected and a further object of the invention is to provide a gasket through which the cooling medium may be circulated without changing the usual circulation of the cooling medium in the engine.

In the accompanying drawing wherein selected embodiments of my invention are illustrated Fig. 1 is a side elevation of an internal combustion engine with which my improved gasket is associated;

Fig. 2 is a plan view of one form of my improved gasket;

Fig. 3 is a fragmentary view of the gasket looking in the direction opposite to Fig. 2;

Fig. 4 is a sectional view taken substantially on the line 4—4 on Fig. 2;

Fig. 5 is another sectional view of the improved gasket; and

Fig. 6 is a sectional view of a modified form of construction.

In the embodiment of the invention illustrated in the accompanying drawing a gasket, generally indicated by 7, is arranged between the head 8 and the block 9 of an internal combustion engine, generally indicated by 10. The head is connected to the block by suitable securing devices such as the bolts 11, these bolts passing through openings 12 in the gasket. The gasket is preferably made of a single piece of material and may be stamped into form or it may be die cast or formed in other analogous manners and is arranged to include openings 13, which are aligned with the cylinders of the engine when the gasket is installed therein, and also to include ports 14 which communicate with the water passages providing the cooling system of the engine. Around the peripheral edge of the gasket, as clearly illustrated in Fig. 2, is an upstanding rib 15. Around the cylinder openings 13 ribs 16 are provided and ribs 17 are provided about the bolt openings 12. The ribs 15, 16 and 17 are of substantially equal height and all of these ribs are of thin cross section. The ribs 15 and 16 cooperate with the body of the gasket to provide a cooling medium or water chamber 18. Certain of the bolt openings 12 are arranged intermediate portions of the ribs 16 of adjacent cylinder openings and certain of the other bolt openings are arranged between the ribs 15 and 16. Extending across the chamber 18 between certain of the ribs surrounding bolt openings, located in the just described manner, and the adjacent ribs 15 and 16 are partition ribs 19, which are of a height and cross section equal to the ribs 15, 16 and 17, and provide dams in the chamber 18. It should be noted that no ribs are provided about the ports 14 and therefore communication between the chamber 18 and the water cooling system of the engine may be established through these ports, cooperating ports being provided in the face of the head 8 or the face of the block 9 against which the body of the gasket is to be fitted. Preferably, though not necessarily, the gasket will be arranged with the body portion thereof rested upon the block 9 and therefore the ports 14 will directly communicate with corresponding ports in the block 9 and ports in the head 8 will communicate with the open side of the chamber 18, it being manifest that the outer ends of the various ribs formed on the gasket will be engaging the adjacent face of the head. By regulating the size of the ports 14 the quantity of water or other cooling medium admitted into the chamber 18 may be controlled. The cooling medium in the chamber 18 will effectively cool the gasket and this medium will circulate in accordance with the circulation of the cooling medium in the engine. In some engines the circulation of the cooling medium is such that it passes in one direction on one side of the block and in the other direction on the other side of the block, and under such circumstances the dams provided by the partition ribs 19 separate the chamber 18 into portions, each of which will be respectively communicating with passages on opposite sides of the block. I have set forth that the dams are provided adjacent bolt openings as I have found this to be a very advantageous location for such dams, but it is to be understood that the partition ribs might be arranged to extend between adjacent upstanding ribs at portions along their extent other than at the bolt openings. In use it may be found that the circulation of the cooling medium is excessive, and I have therefore provided an arrangement whereby such circulation may be retarded, and this consists in providing a gate or gates, such as 20, which consists of a flat metal plate having an outline substantially similar to the outline of the portions of the gasket with which it is to be associated preferably by a wedge fit. This provides a simple and effective means for retarding the circulation not only through the gasket but also through the engine and moreover these gates may be located in any desired position, and if it is found that certain portions are being cooled more than desired these gates may be arranged adjacent such portions to therefore retard the circulation and thus avoid this condition.

In the embodiment of the invention thus far described the chamber 18 has been arranged entirely in one face of the gasket. In the embodiment of the invention illustrated in Fig. 6 the ribs 16' about the openings 13' as well as the other ribs are arranged to extend on both sides of the body of the gasket and thus chambers 18', 18' are provided in opposite faces of the gasket. In both forms of the invention the circulation of water in the gasket not only cools the gasket but also assists in cooling the block and head of the engine.

In the selected embodiments of the invention disclosed herein I have set forth certain forms of construction, but it is to be understood that the invention is not limited to such forms as changes and alterations might be made therein and I therefore do not wish to be limited to the precise details set forth but desire to avail myself of such variations and modifications as fall within the purview of the following claims.

I claim:

1. A gasket adapted to be interposed between the block and head of an internal combustion engine, said gasket comprising a body recessed in one face thereof and providing a cooling chamber adapted to be closed by said block or head, and said body having an opening therein adapted for registration with an opening in said block or head and communicating with said cooling chamber.

2. A gasket adapted to be interposed between the block and head of an internal combustion engine, said gasket comprising a body recessed in both faces thereof and providing cooling chambers adapted to be closed by said block and head respectively, and said body having an opening therein to establish communication between the cooling chambers in the opposite faces thereof.

3. A gasket adapted to be interposed between the block and head of an internal combustion engine, said gasket comprising a body recessed in one face thereof, a partition dividing said recessed face into a plurality of cooling chambers adapted to be closed by said block or head, and said body having openings therein adapted for registration with openings in said block or head and respectively communicating with the cooling chambers.

4. A gasket adapted to be interposed between the block and head of an internal combustion engine, said gasket comprising a body recessed in one face thereof, a partition dividing said recessed face into a plurality of independent cooling chambers adapted to be closed by said block or head, and said body having openings therein adapted for registration with openings in said block or head and respectively communicating with the independent cooling chambers.

5. A gasket adapted to be interposed between the block and head of an internal combustion engine, said gasket comprising a body recessed in one face thereof and providing a chamber adapted to be closed by said block or head, said block or head having a circulation system adapted to communicate with and include said chamber, and means in said chamber for controlling the circulation therein.

6. A gasket adapted to be interposed between the block and head of an internal combustion engine, said gasket comprising a body having circulation openings therein and recessed in one face thereof to provide a chamber adapted to be closed by said block or head, said block and head having a circulation system adapted to include said openings and chamber, and removable means adapted to be arranged in said chamber to close or to partially close one or more of said openings and control the circulation through the openings.

7. A gasket adapted to be interposed between the block and head of an internal combustion engine, said gasket comprising a body having circulation openings therein and recessed in one face thereof to provide a chamber adapted to be closed by said block or head, said block and head having a circulation system adapted to include said openings and chamber, and removable plates adapted to be arranged in said chamber to form gates closing or partially closing one or more of said openings and control the circulation through the openings.

8. A gasket including a body having a cooling chamber at the top and another cooling chamber at the bottom thereof adapted to receive a cooling medium and also having openings establishing communication betwen said chambers.

9. A gasket including a body having ribs thereon providing a cooling chamber adapted to receive a cooling medium, and dams extending between said ribs for dividing said chamber, said body having openings for said cooling medium communicating with each part of said divided chamber.

10. A gasket including a body having openings therein, a rib at the peripheral edge of said body, and ribs at the edges of certain of said openings, said ribs providing a cooling chamber on said body adapted to receive a cooling medium.

11. A gasket including a body having openings therein, a rib at the peripheral edge of said body, ribs at the edges of certain of said openings, said ribs providing a cooling chamber on said body adapted to receive a cooling medium, and other ribs on said body for dividing said chamber.

12. A gasket including a body having openings therein, a rib at the peripheral edge of said body, ribs at the edges of certain of said openings, said ribs providing a cooling chamber on said body adapted to receive a cooling medium, and independent means for restricting the size of selected of said openings.

13. A cylinder head gasket including a body having cylinder and bolt openings and water ports therein, a rib at the peripheral edge of said body, and ribs at the edges of said cylinder and bolt openings, said ribs providing a cooling chamber on said body adapted to receive water through said ports.

14. A cylinder head gasket including a body having cylinder and bolt openings and water ports therein, a rib at the peripheral edge of said body, ribs at the edges of said cylinder and bolt openings, said ribs providing a cooling chamber on said body adapted to receive water through said ports, and other ribs on said body for dividing said chamber.

15. A cylinder head gasket including a body having cylinder and bolt openings and water ports therein, a rib at the peripheral edge of said body, ribs at the edges of said cylinder and bolt openings, said ribs providing a cooling chamber on said body adapted to receive water through said ports, and independent means for restricting the size of selected of said ports.

BENJAMIN J. VICTOR.